UNITED STATES PATENT OFFICE.

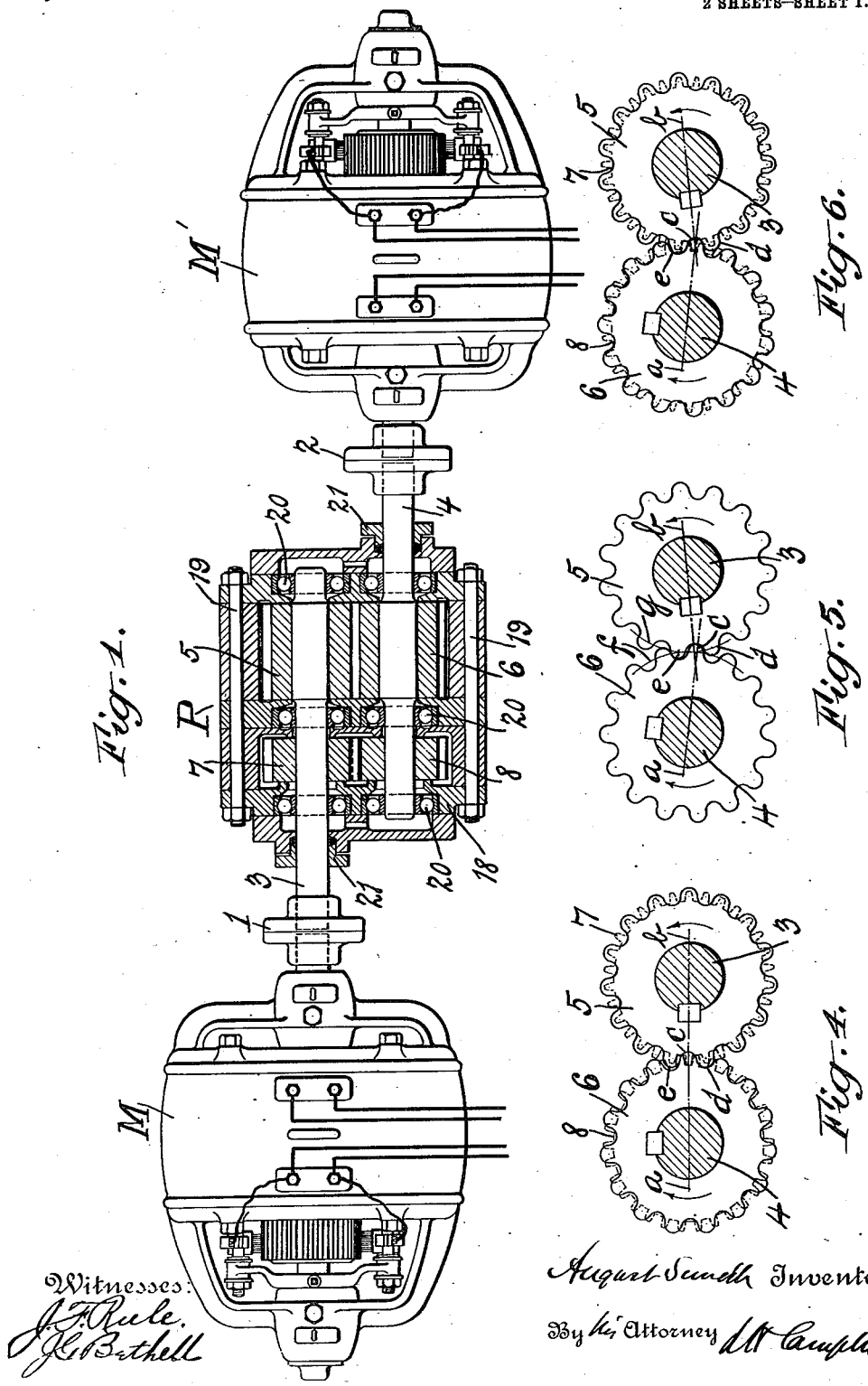

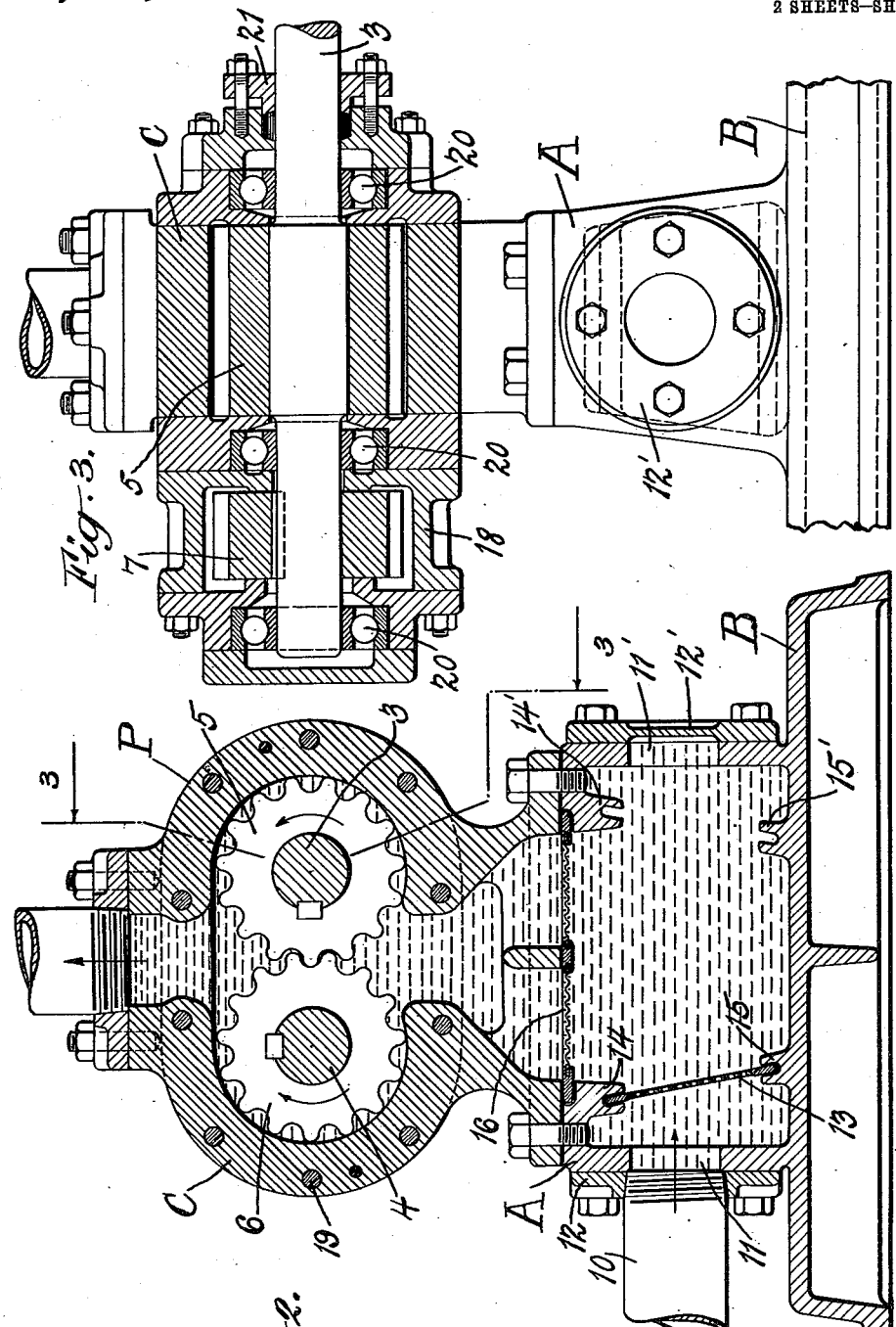

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

ROTARY GEAR-PUMP.

1,132,747. Specification of Letters Patent. Patented Mar. 23, 1915.

Application filed February 18, 1910. Serial No. 544,640.

*To all whom it may concern:*

Be it known that I, AUGUST SUNDH, a citizen of the United States, residing at Yonkers, in the county of Westchester and State of New York, have invented a new and useful Improvement in Rotary Gear-Pumps, of which the following is a specification.

My invention relates to pumping mechanism and more particularly to rotary gear pumps in which intermeshing rotary pump gears are used to pump the liquid against pressure.

The invention comprises the use of separate motors or driving elements for the pump gears together with means for keeping the motors in exact synchronism. It has been found that where intermeshing pump gears having rounded gear teeth are driven by separate motors the speed of the gears is irregular and out of synchronism causing considerable leakage, friction and loss of power.

The present invention involves the use of additional gears which act as guiding means to maintain the speeds of the driving shafts exactly uniform, thereby causing the pump gears to run true, and thus overcoming the objectionable features incident to the irregular movement of the gears without such guiding means.

The exact nature of the invention and the objects sought to be attained will appear more fully hereinafter.

In the accompanying drawings which illustrate a construction embodying the principles of the present invention, Figure 1 is a part sectional plan view showing the gear pump and driving motors. Fig. 2 is a sectional elevation view through the pump. Fig. 3 is a part sectional elevation as indicated by the section line 3—3 on Fig. 2. Fig. 4 is a diagrammatic view showing the relation of the intermeshing pump gears together with the guiding gears. Fig. 5 is a similar view but with the guiding gears omitted and the pumping gears rotated through a small angle to indicate an irregular movement when the guiding gears are omitted. Fig. 6 is a view similar to Fig. 4 but with the gears rotated through a small angle.

The rotary gear pump P comprises a supply chamber or casing A mounted on or formed integral with the base B, and a gear casing C located over the supply chamber. Liquid is admitted to the supply chamber through a supply pipe 10 registering with an opening 11 in the end of the casing A. The pipe 10 is screw-threaded into a cap 12 bolted to the casing. The supply pipe 10 may, if desired, be connected with the opposite end of the casing A which is provided with an opening 11' covered by a cap 12'. With this arrangement the cap 12' will be used to cover the opening 11. Within the supply chamber is a screen 13 removably held in guides 14 and 15 which may be formed integral with the casing. This screen is for the purpose of arresting any sand or dirt which may be carried in with the supply liquid. The screen is inclined as shown so that such foreign substances may readily fall to the bottom of the casing. When the supply pipe 10 is connected to the opposite end of the supply chamber, the screen 13 is placed in the guides 14', 15'. A horizontal screen 16 is also employed and may be removably held in position as shown between the supply chamber and pump gear casing. This screen 16 is of finer mesh than the screen 13 and serves to arrest any foreign substances that may escape through the screen 13, and, being horizontally placed, the dirt readily falls to the bottom of the casing, and as the screen has a large area, it is not readily clogged. These screens are of importance in removing from the supply liquid all grit or dirt which might otherwise be carried by the pump gears to the pressure side of the pump and from thence downward between the intermeshing gear teeth where it would cause cutting and wear of the gears.

The pump gears are separately driven by electric motors M and M' which have their shafts connected through couplings 1 and 2 respectively with the gear shafts 3 and 4 on which are keyed the intermeshing rotary pump gears 5 and 6 located within the casing C. It will be understood that any suitable type of electric motor, engine, or other prime mover or driving element may be employed. The motors are preferably duplicates or designed to run at the same speed.

The teeth on the pump gears 5 and 6 are rounded as shown to prevent the liquid from being locked between them as they intermesh. These teeth are preferably substantially semi-circular and separated by correspondingly shaped recesses.

An important feature of the present invention resides in the provision of means in combination with the separate driving motors to control the relative movement of the drive shafts and cause them to rotate at the same speed. In the present construction I have shown intermeshing spur gears 7 and 8 which, as well understood by those skilled in the art, will, if properly designed, cause both the shafts to rotate at the same angular velocity and without any slipping or independent movement of either shaft. It will be understood that any other suitable means which will accomplish this result is comprehended in the scope of the present invention.

Referring particularly to Figs. 4, 5 and 6, the relative movement of the pump gears when properly guided by the spur gears 7 and 8, is shown in Figs. 4 and 6 while Fig. 5 indicates an unequal movement of the gears when not so guided. In Fig. 4 a broken line *a—b* connects the centers of the gear shafts and bisects a tooth *c* on the pump gear 6, this line also bisecting the recess between the adjacent teeth *d* and *e* of the gear 5. In Fig. 5 the pump gears have been rotated through a slight angle from the position shown in Fig. 4. The radial line *a* of the gear 6 as shown, intersects the pitch lines *f* and *g* below the point at which the radial line *b* of the gear 5 intersects the pitch lines. In other words the two radial lines *a* and *b* intersect each other at a point to the left of the pitch lines *f* and *g* instead of at or between them. As the lines *a* and *b* are in the same positions relative to the pump gears as in Fig. 4, it is evident that the gear 6 in Fig. 5 has rotated through a greater angle than the gear 5. In other words the gear 6 has rotated faster than the gear 5. As the gears continue to rotate and as the tooth *e* is moving into alinement with the centers of the gears, the gear 5 must rotate through a larger angle than the gear 6 in order to bring the gears into a position corresponding to Fig. 4. This irregular movement will take place with each pair of intermeshing teeth as the gears rotate. Such irregular movement of the gears is not a mere theory but is found to take place in practice and moreover it has been found practically impossible to operate the pump gears without such irregular movement without the use of some guiding means such as the gears 7 and 8 to insure a uniform movement of the drive shafts. Where such guiding means are employed the pump gears rotate at the same velocity, keeping the gear teeth in their proper relative position as indicated in Fig. 6 by the radial lines *a—b* which in this case intersect each other at a point equally distant from the centers of the gears.

It is to be noted that the gears 7 and 8 are not driving gears as this term is ordinarily used, or in other words are not for the purpose of transmitting the power from one shaft to drive the other shaft but merely to maintain the speeds of the shafts uniform. The noise and wear and other objectionable features incident to the use of such gears, when used as driving gears in connection with a single motor, are not present where these gears are used as in the present construction. The gears 7 and 8 may be inclosed in a casing 18 secured to the pump casing by means of rods 19, and ball bearings 20 or other form of roller bearings are preferably employed for the pump shafts. Stuffing boxes 21 are also provided to prevent leakage from the casings.

As the oil or other circulating fluid is supplied by the pump gears to the pump gear chamber under considerable pressure, a portion of the fluid is carried through the bearing raceways in the partition wall and to the chamber containing the spur gears 7 and 8 and also to the ball bearings in the end walls of the casing. In this way the spur gears 7 and 8 and all the bearings are kept well lubricated, and at the same time the stuffing boxes 21 prevent the escape of the fluid from the casing.

I wish not to be limited to the exact construction herein shown as various modifications might be made within the scope of the invention.

What I claim as new and desire to secure by Letters Patent of the United States, is:—

1. In a rotary gear pump, the combination of intermeshing pumping gears, shafts on which said gears are secured, guiding gears for the pumping gears, also secured to said shafts, anti-friction bearings for said shafts, and communicating chambers in which said pumping gears, guiding gears and bearings are inclosed.

2. In pumping mechanism, the combination of a casing provided with a partition separating the casing into two compartments, shafts extending into the casing, intermeshing rotary pump gears located in one of said compartments and secured to said shafts, intermeshing spur gears secured to said shafts and located in the other compartment, anti-friction bearings for said shafts located in said partition, and a lubricating material circulated by the pump gears and adapted to maintain said bearings and spur gears lubricated by leakage from the pump gear chamber.

3. In pumping apparatus, the combination of a casing, intermeshing pump gears within the casing, shafts on which said gears are mounted, anti-friction bearings within the casing, a lubricating material circulated by the pump gears, said bearings being lubricated by said material, and stuffing boxes for said shafts located in the walls of the casing outside of said bearings.

In testimony whereof, I have signed my name to this specification in the presence of two subscribing witnesses.

AUGUST SUNDH.

Witnesses:
JOHN F. RULE,
JAMES G. BETHELL.